(12) United States Patent
Malkamäki et al.

(10) Patent No.: US 10,458,269 B2
(45) Date of Patent: Oct. 29, 2019

(54) CONTROLLABLE MULTI-SPOOL GAS TURBINE PLANT WITH INDEPENDENT GENERATOR SPEED CONTROL AND HOLLOW TURBINE-COMPRESSOR SEPARATOR

(71) Applicant: AURELIA TURBINES OY, Lappeenranta (FI)

(72) Inventors: Matti Malkamäki, Berlin (DE); Jari Backman, Lappeenranta (FI); Juha Honkatukia, Lappeenranta (FI); Ahti Jaatinen-Värri, Lappeenranta (FI)

(73) Assignee: AURELIA TURBINES OY, Lappeenranta (FI)

( * ) Notice: Subject to any disclaimer, the term of this patent is extended or adjusted under 35 U.S.C. 154(b) by 0 days.

(21) Appl. No.: 15/561,087

(22) PCT Filed: Mar. 23, 2016

(86) PCT No.: PCT/FI2016/050182
§ 371 (c)(1),
(2) Date: Sep. 25, 2017

(87) PCT Pub. No.: WO2016/151198
PCT Pub. Date: Sep. 29, 2016

(65) Prior Publication Data
US 2018/0058242 A1    Mar. 1, 2018

(30) Foreign Application Priority Data
Mar. 23, 2015 (GB) .................. 1504839.0

(51) Int. Cl.
*F02C 6/00* (2006.01)
*F01D 13/00* (2006.01)
(Continued)

(52) U.S. Cl.
CPC ........... *F01D 13/003* (2013.01); *F01D 15/10* (2013.01); *F02C 3/085* (2013.01); *F02C 6/003* (2013.01);
(Continued)

(58) Field of Classification Search
CPC ....... B63H 21/16; F01D 13/003; F01D 15/10; F02C 3/085; F02C 6/003; F02C 6/02;
(Continued)

(56) References Cited

U.S. PATENT DOCUMENTS 2,709,893 A * 6/1955 Birmann ................... F02C 3/05
415/115
4,756,673 A * 7/1988 Miyashita ............... F01D 25/14
417/400

(Continued)

FOREIGN PATENT DOCUMENTS

RU      2549743 C1    4/2015

OTHER PUBLICATIONS

UK Intellectual Property Office; Search Report issued in GB1504839.0, dated Sep. 15, 2015.

*Primary Examiner* — Tulsidas C Patel
*Assistant Examiner* — S. Mikailoff
(74) *Attorney, Agent, or Firm* — Berggren LLP (57) ABSTRACT

The invention concerns land-based gas turbine plants with a multi-spool gas turbine arrangement for generating electrical power to supply a load (200). The invention comprises at least three spools (10a-10c). Each of the at least three spools (10a-10c) comprises a shaft (11a-11c), a compressor (C1-C3) and a turbine (T1-T3). Each one of the shafts (11a-11c) of the at least three spools (10a-10c) are independently rotatable with respect to each other. The invention further comprises electrical generators (G1-G3) mounted on each of the shafts (11a-11c) of the at least three spools
(Continued)

(10a-10c), the output power of the generators being independently controllable and at least 60 percent of a total output power supplied to said load (200) in a form of electrical and rotational power is generated by the at least three generators (G1-G3) in the form of electrical energy.

15 Claims, 4 Drawing Sheets (51) Int. Cl.
*F01D 15/10* (2006.01)
*F02C 6/02* (2006.01)
*F02C 3/08* (2006.01)
*F02C 7/08* (2006.01)
*H02K 7/18* (2006.01)
*B63H 21/16* (2006.01)
*F02C 6/20* (2006.01)

(52) U.S. Cl.
CPC ............... *F02C 6/02* (2013.01); *F02C 7/08* (2013.01); *H02K 7/1823* (2013.01); *B63H 21/16* (2013.01); *F02C 6/203* (2013.01); *F05D 2220/32* (2013.01); *F05D 2220/764* (2013.01); *F05D 2240/60* (2013.01)

(58) Field of Classification Search
CPC ........ F02C 6/203; F02C 7/08; F05D 2220/32; F05D 2220/764; F05D 2240/60; H02K 7/1823
See application file for complete search history.

(56) References Cited

U.S. PATENT DOCUMENTS

| | | | |
|---|---|---|---|
| 4,800,717 A * | 1/1989 | Rodgers | F01D 5/046 415/115 |
| 4,926,630 A * | 5/1990 | Shekleton | F02C 3/05 60/758 |
| 4,991,390 A * | 2/1991 | Shah | F01D 5/188 415/115 |
| 5,313,782 A | 5/1994 | Frutschi et al. | |
| 5,347,806 A | 9/1994 | Nakhamkin | |
| 7,559,745 B2 * | 7/2009 | Falk | F04D 29/284 416/188 |
| 9,765,693 B2 * | 9/2017 | Kraft | F02C 6/16 |
| 9,890,707 B2 * | 2/2018 | Kraft | F02C 6/00 |
| 2002/0152754 A1 | 10/2002 | MacKay | |
| 2005/0056021 A1 | 3/2005 | Belokon et al. | |
| 2011/0094236 A1 | 4/2011 | Finkenrath et al. | |
| 2011/0156394 A1 * | 6/2011 | Klusman | F16C 17/024 290/52 |
| 2012/0000204 A1 * | 1/2012 | Kesseli | F02C 3/107 60/778 |
| 2012/0324903 A1 * | 12/2012 | Dewis | F02C 7/143 60/772 |
| 2013/0249213 A1 * | 9/2013 | Oesterheld | H02P 9/08 290/31 |
| 2014/0000270 A1 * | 1/2014 | Dobbeling | F02C 3/04 60/772 |
| 2014/0373551 A1 * | 12/2014 | Kraft | F02C 6/16 60/772 |
| 2015/0240719 A1 * | 8/2015 | Kraft | F02C 6/00 290/52 |
| 2018/0058242 A1 * | 3/2018 | Malkamaki | F01D 13/003 |
| 2018/0058320 A1 * | 3/2018 | MacNaghten | F02C 6/16 |
| 2018/0252158 A1 * | 9/2018 | Malkamaki | F02C 1/06 |

* cited by examiner

CONTROLLABLE MULTI-SPOOL GAS TURBINE PLANT WITH INDEPENDENT GENERATOR SPEED CONTROL AND HOLLOW TURBINE-COMPRESSOR SEPARATOR

This application is a national phase application of international application PCT/FI2016/050182 which was filed on Mar. 23, 2016 claiming priority of UK national application 1504839.0 filed on Mar. 23, 2015, the contents of both of which are incorporated herein by reference.

TECHNICAL FIELD

The invention concerns in general the technical field of electrical power generation by utilizing gas turbine plants. Especially the invention concerns land based stationary gas turbine plants or marine-based gas turbine plants with a multi-spool gas turbine arrangement for generating electrical power to supply a load.

BACKGROUND

The electrical energy production is at the moment going through major changes. The pollution and greenhouse gas emissions of the energy sector have gained increasing attention. At the same time as the electrical energy production is moving towards renewable energy based energy production, the electrical grid is also facing new challenges. Previously, the power plants connected to the electrical grid were very large such as nuclear power plants, large coal-based power plants, etc. This centralized electrical power generation, of course, causes losses in the electrical grid because the energy must be transferred over long distances.

Distributed power generation is closer to the consumption and thus smaller losses occur in the electrical grid due to shorter distances over which the energy is being transferred compared to the case of centralized power generation. In contrast to the centralized power generation plants which typically operate at their rated power, the distributed power generation plants have to be able to constantly adjust their operation and output power based on load demand. This is especially important if the electrical grid seizes to feed or receive power such as in case of islanding conditions during which the power generation and power consumption must be equal typically in a rather small area wherein the electrical grid is weak. In these cases, the operation is entirely relying on the control and operation of a single power generation unit or few power generation units. It is, therefore, of utmost importance to have power plants which can run at high efficiency also at part-load conditions and can adjust their output rapidly.

One major reason why the amount of distributed energy production has not increased more is the higher price of the energy produced by these systems compared to, e.g., price of the electricity from the grid. This is typically due to a lower electrical efficiency compared to large power plants. Gas engine or gas turbine plants, which are more and more being used in the electrical energy production, are good examples of power plants that can be utilized in distributed power generation.

Gas turbine plants are typically designed to operate at 100 percent of the nominal load, i.e. the design point. Nowadays, the electrical production efficiencies of commercial gas turbines at their design points are at the most around 40 percent, especially in the plants with electrical power rating less than 20 megawatts at most. The electrical efficiency which itself is not very high, quickly decreases if the gas turbine is being operated at part-load conditions, i.e., at load conditions less than 100 percent of the nominal load.

A typical gas turbine power plant comprises a compressor, a combustor, a turbine and an electrical generator. The compressor and the turbine are mounted on the same shaft and form a single spool. The generator is also mounted on the shaft. Some prior art, however, describes solutions with gas turbines having two spools. Two-spool arrangement offers potentially better efficiency than a single-spool system because more power can be produced with the same turbine inlet temperature compared to a single-spool arrangement.

Some prior art describes also gas turbines with multi-spool arrangement. Most of these are in the aviation related applications in which the weight and compactness are very important in the designing of these systems. In land- and marine-based applications, the size and structure are less important but, on the other hand, the efficiency and controllability become more important. Also, especially, in distributed power generation, the controllability and part-load operation are essential when designing the gas turbine plant.

Most commonly, multi-spool gas turbines in land-based applications have two spools. The two spools of the gas turbines are different in a way that there is a high pressure spool and a low pressure spool. Low pressure spool is typically connected to the main electrical generator while the high pressure spool is operating as a gas compressing spool. The magnitude of the pressure increase that a compressor in a single-spool system or the two compressors in the two-spool system must be able to produce typically affects the efficiency of the compressors and the system in a way that the higher the total pressure increase, the lower the compressor efficiency.

In some attempted solutions of the gas turbine plants, two or more spools have been utilized wherein both or all of the spools have electrical generators coupled to the spools. In these solutions, the power taken out of the gas turbine plant has been taken mainly from a single electrical generator, that is a main generator, and the other generators have been working as auxiliary motors/generators, typically having lower power ratings than the main generator and having rotational speeds at different speed ranges than the main generator. There are also solutions in which both or all of the electrical generators have been used primarily for controlling the operation of the gas turbine plant, thus both or all of the generators being auxiliary motors/generators, while the power taken out of the gas turbine plant is mainly taken from an additional free turbine spool to which an additional generator, operating in these cases as the main generator, is connected to.

SUMMARY

An objective of the invention is to present an arrangement to alleviate one or more of the above disadvantages related to electrical energy production using gas turbines, particularly, to provide high efficiency also at part-load conditions. The objectives of the invention are reached by the arrangement as defined by the respective independent claim. The preferred embodiments of the invention are disclosed in the dependent claims.

According to a first aspect, a stationary land-based or marine-based multi-spool gas turbine arrangement for generating electrical power to supply a load, wherein said load is external with respect to the arrangement, is provided. The arrangement comprises at least three spools, each one of the at least three spools including a shaft, a compressor and a turbine mounted on the shaft. The arrangement also comprises a highest pressure compressor being the compressor mounted on the shaft of the spool the turbine of which is being arranged to have the highest pressure of the turbines, i.e. a highest pressure turbine, is also being mounted on. The arrangement also comprises a first combustor operable to combust or react a mixture of fuel so that compressed gas from the highest pressure compressor turns into gas with elevated temperature that is expanded in the highest pressure turbine to produce mechanical power to drive the highest pressure compressor wherein the highest pressure turbine is being the first turbine arranged to receive said gas with elevated temperature from the first combustor. The at least three spools being in fluid communication with each other, wherein each one of downstream turbines is being arranged to receive gas at higher pressure from an immediately preceding upstream turbine arranged to operate at higher pressure than the one of the downstream turbines receiving gas at higher pressure, and each one of compressors being arranged to receive gas at lower pressure from an immediately preceding compressor arranged to operate at lower pressure than the one of the compressors receiving gas at lower pressure. The arrangement also comprises at least three generators, each of which being mechanically directly coupled to a predefined one of the shafts to be rotatably driven thereby, each one of the shafts thus having one mechanically coupled generator and a number of the at least three generators being equal to a number of the shafts. Each one of the at least three generators thus rotating at the same speed as the shaft to which the generator is coupled to. The at least three generators are being operable to generate an alternating electrical current arranged to be supplied to said load and the electrical power outputs of the at least three generators being independently controllable of each other. At least 60 percent of a total output power supplied to said load in a form of electrical and rotational power is generated by the at least three generators in the form of electrical energy, wherein the total output power is a sum of electrical and rotational power supplied to said load by the arrangement.

Said load external with respect to the arrangement and into which said load the electrical power is to be supplied may be an electrical grid or a stand-alone electrical load such as an electrical supply system of a hospital or an industrial plant or a residential load.

Especially the invention relate to above mentioned arrangement in combination with a stationary land based gas turbine plant or marine-based gas turbine plant, that is, specifically the invention concerns land- or marine-based gas turbine plants with a multi-spool gas turbine arrangement for generating electrical power to supply of an external load.

Marine based gas turbine plants may be used in combination with an electrical supply system of a ship and/or an electrical motor part of a marine propulsion system of a ship.

The arrangement may further comprise a first heat exchanger arranged to receive said compressed gas from the highest pressure compressor, and gas from the last downstream turbine arranged to have the lowest pressure of the turbines, i.e. the lowest pressure turbine, causing heat transfer from said gas from the last downstream turbine to said compressed gas so as to pre-heat said compressed gas prior to combustion in the first combustor.

The arrangement may further comprise at least one second heat exchanger arranged fluidly between two compressors to receive gas from one with lower pressure of the two compressors to be transferred into other with higher pressure of the two compressors, and cooling medium from an external source so as to decrease a temperature of said gas from the one with lower pressure of the two compressors, each one of the at least one second heat exchanger arranged to transfer said gas from the one with lower pressure of the two compressors into the other with higher pressure of the two compressors.

The arrangement may further comprise at least one second combustor arranged fluidly between two turbines and operable to combust or react a mixture of fuel so that a temperature of gas from one with higher pressure of the two turbines increases, the at least one second combustor arranged to re-heat said gas from the one with higher pressure of the two turbines and to transfer said gas from the one with higher pressure of the two turbines to other with lower pressure of the two turbines.

The arrangement may further comprise compressor and turbine mounted on the same shaft being connected to each other via a planar element placed in between the compressor and the turbine wherein a plane defined by the planar element is perpendicular to a longitudinal axis of the shaft in at least one of the at least three spools.

The arrangement may comprise a planar element being a partially hollow planar element arranged so that air can flow inside the partially hollow planar element providing cooling for the partially hollow planar element.

The arrangement may further comprise an auxiliary system comprising an energy source for operating the gas turbine arrangement during interruption in the electrical grid or a planned maintenance outage.

The arrangement may comprise the first combustor comprising an ignition system and a fuel injection system.

The arrangement may comprise at least one of the compressors being a centrifugal compressor.

The arrangement may comprise at least one of the turbines being a radial turbine.

The arrangement may further comprise a control system for controlling the operation of the gas turbine arrangement.

The arrangement may further comprise a burner arranged in fluid communication with the gas turbine wherein the gas from the lowest pressure turbine or from the first heat exchanger are being utilized in the burner.

The arrangement may further comprise a heat utilization process arranged in fluid communication with the gas turbine arrangement in which the cooling medium from at least one of the second heat exchangers, if water, is injected to the heat utilization process and utilized for heating.

The arrangement may further comprise the at least three generators having nominally substantially equal power ratings, and the rotating parts of the at least three generators having nominally substantially equal rotational speed ratings.

The arrangement may comprise at least part of the alternating electrical current arranged to be utilized in self-consumption of the arrangement such as the power needed for the control system or the active magnetic bearings.

The arrangement may comprise at least one active magnetic bearing coupled to each one of the shafts.

Similar type of arrangement as mentioned above may be used for generating power to an electrical motor of a train or heavy machinery. However there may be then dissimilar advantages because of difference in power demand from gas turbines.

An advantage of the arrangement according to the present invention is that the control of the multi-spool arrangement provides somewhat independent control of the spools and electrical output of the generators and thus the system can be utilized more efficiently than a single-spool or two-spool system. The total pressure over all of the compressors is divided between more than two compressors thus yielding better efficiency compared to single or two-spool systems.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

The terms "first", "second" and "third" are herein used to distinguish elements from each other, and not to specially prioritize or order them, if not otherwise explicitly stated.

BRIEF DESCRIPTION OF FIGURES

The embodiments of the invention are illustrated by way of example, and not by way of limitation, in the figures of the accompanying drawings.

DETAILED DESCRIPTION

The present invention relates preferably to an arrangement for producing electrical power to supply a load by utilizing a stationary land-based gas turbine. Land-based gas turbines refer to any stationary application utilizing gas turbines on land such as power plants connected to electrical grid or to a local load such as an electrical supply of a hospital or an industrial plant. The present disclosure relates also marine-based gas turbines which refer for producing electrical power refer to gas turbines which are used in marine applications for producing electrical power for example in a marine based gas turbine plant.

The compressors used in the embodiments according to the present invention may, preferable, be of the centrifugal type but may also be of the axial type or any other type capable of increasing the pressure of the fluid flowing through the compressor. The materials used in the compressors and, especially, in their blades may be, e.g. but not limited to, aluminum, titanium alloys or martensitic steel alloys. There may also be specific coatings to improve erosion resistance of the blades and to enable higher temperature to be utilized.

The turbines used in the embodiments according to the present invention may, preferable, be of the radial type but may also be of the axial type or any other type capable of letting the fluid flowing through the turbines and thus to produce mechanical power. The materials used in the turbines and, especially, in their blades may be, e.g. but not limited to, iron- or nickel-based alloys being produced by utilizing either conventional ingot metallurgy or powder metallurgy. Also ceramic materials may be used in the turbines. There may also be specific coatings to improve erosion resistance of the blades and to enable higher temperature to be utilized.

The heat exchangers used in the embodiments according to the present invention may, preferable, be of the counter-current flow type but may also be any other kind of a heat exchanger operable to transfer the heat from a heat source with higher temperature to the air coming into the heat exchanger. The heat source with higher temperature may be, e.g., hot gas leaving from some of the turbines. Heat exchangers may also be used to cool the air in the gas turbine by using a cooling medium with lower temperature to remove some of the heat in the air flowing in the gas turbine. The cooling medium used may be, e.g., liquid such as water or any other fluid. Materials used in the production of heat exchangers may be any material withstanding the elevated temperatures and pressures and having typically high thermal conductivities. These may be, e.g. but not limited to, stainless-steel-based or nickel-chromium-based alloys.

The combustors used in the embodiments according to the present invention may be any kind of combustor operable to combust the mixture of air and fuel to produce hot gas. It may be a simple can type combustor or a combustor with a more complicated structure. It may be cannular, annular or double annular combustor. The combustors, preferably, comprise a fuel injection and an ignition system operable to combust mixture of air and fuel. Preferably, the amount of fuel injected by the fuel injection system can be controlled by the control system of the gas turbine. The fuel injection system may, e.g., be a pressurized fuel injection system having a spraying system with spray nozzles through which the fuel is being pumped with pressure. If the fuel used in the combustor requires utilization of the atomizing air or other supporting mechanisms in order to achieve controllable and efficient combustion, also these may be included in the combustor. The fuel injection system may include one or several valves in series or in parallel for controlling the flow of the fuel.

The combustors may also include an externally fired combustor in which case the heat generated by it is transferred to the pressurized air from the first compressor using a heat exchanger integrated into or installed in connection with the externally fired combustor. Accordingly, the pressurized air raises in temperature on its way towards the first turbine. For instance, when the fuel utilized is unsuitable for use in gas turbines, externally fired combustor may be preferred to prevent harmful particles entering the gas turbine process.

The fuel injected may be controlled based on the desired amount of power injected to the electrical grid or to any load in electrical connection with the gas turbine. The fuel injection may be controlled based on other parameters as well such as, e.g., voltage, current, temperature, pressure or mass flow. The combustor may also be of the variable geometry type. Variable geometry type of combustor may include an actuator with which the geometry of the combustor may be altered. The combustor may be constructed by using variety of materials being able to withstand the elevated temperatures and pressures occurring in the gas turbine process. These materials may be, e.g. but not limited to, nickel- or cobalt-based alloys. Also ceramic materials may be used in the combustors. There can also be various thermal barrier coating materials serving as an insulating layer to reduce the underlying metal base temperatures.

The control system, preferably, includes electronics and power electronic devices capable of controlling the torque and rotational speed of all of the electrical generators. The control system may include frequency converters for the electrical generators or may include rectifiers for the generators to convert the alternating current (AC) generated by the generators, in case of AC generators, into direct current (DC) and then an inverter or inverters to convert the DC into AC with the same frequency as, for example, in the electrical grid or an AC load. AC current generated by electrical generators may thus be supplied to the load via elements such as described above and not directly fed to the load. The characteristics of the AC may also change before being injected to the load. The control system may be able to receive information from the sensors arranged to measure thermodynamic parameters of the system such as temperatures and pressures and/or electrical parameters such as currents and voltages of the generators, power electronic circuits, parameters in the auxiliary systems or voltages and currents in the electrical grid or load into which the electrical power of the gas turbine is being injected. The control system may include feedback loops, feed-forward paths and may be based on some of the variety of control methods such as, e.g., scalar volts-per-Hertz control, vector control also known as field-oriented control or direct torque control.

The control system may include, e.g., a central processing unit (CPU), a memory element such as, for example, Random-Access Memory (RAM), and a communication unit. The control software such as control algorithms are being stored in the memory and performed by the CPU. The communication unit, which may be utilized to send and/or receive data to/from an external system, may comprise an antenna and/or a communication port for wired communication technology, e.g. Ethernet or other local area network (LAN) interface. In case of wireless communication, the receiver may utilize e.g. radio frequency technologies such as wireless local area network (WLAN), Global System for Mobile Communication (GSM), Third Generation (3G), Long Term Evolution (LTE) technologies, Fourth Generation (4G).

According to some embodiments of the present invention, at least some of the electrical generators may be identical or, alternatively, at least some of them may be different types of electrical generators. The electrical generators utilized in the gas turbine arrangement according to the embodiments of the present invention may be of synchronous or asynchronous type. The generators may be DC generators, permanent magnet generators, induction generators, doubly-fed induction generators or any other kinds of generators operable to convert mechanical energy of the rotating axis into electrical energy. The number of phases of the generators may, preferably be three, but may also be two in case of DC generators, or, e.g., six. Also, the generators may have wye or delta connection and be either grounded or ungrounded.

Figure 1:
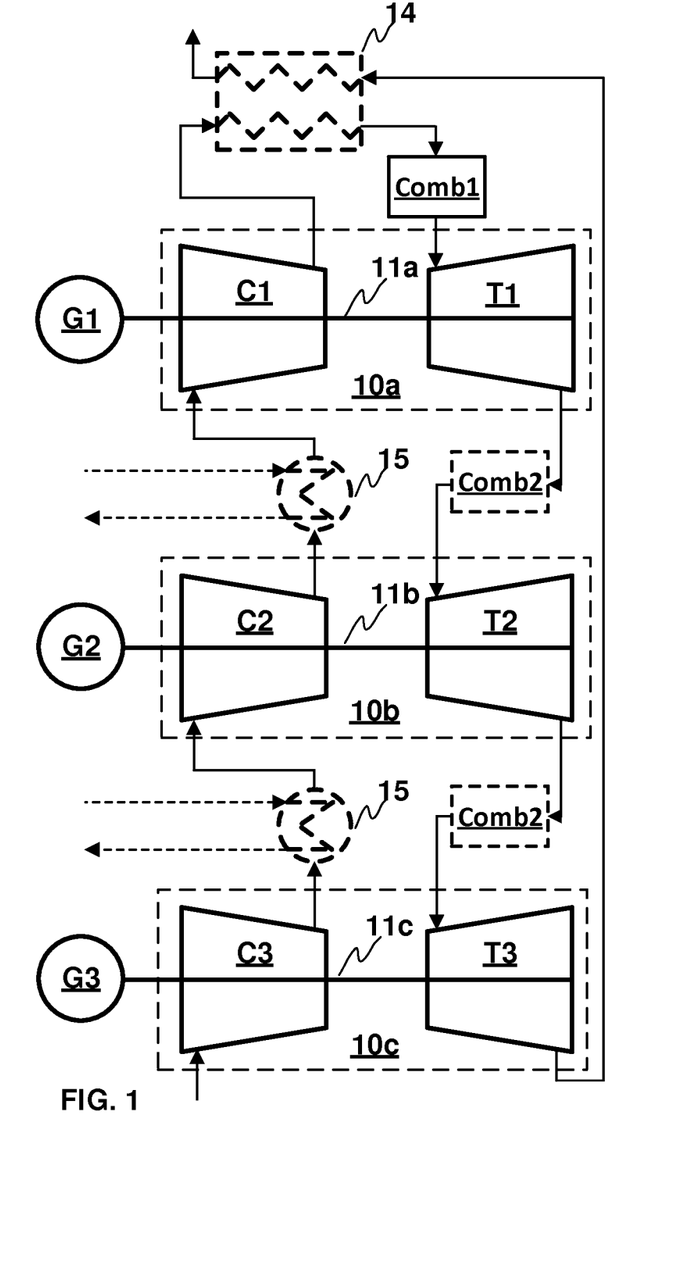
FIG. 1 illustrates schematically a gas turbine arrangement according to an embodiment of the present invention.

The gas turbine arrangement with three spools according to an embodiment of the present invention is shown schematically in FIG. 1 including some optional elements marked with dashed lines. The optional elements in FIG. 1 are the same in embodiments with more than three spools.

The elements of the gas turbine in FIG. 1 and their primary purposes may, in general terms, be described as follows. The third compressor C3, the second compressor C2 and the first compressor C1 increase the pressure of the gas, typically air, flowing through them. Second heat exchangers 15 may be used to remove some of the heat from the air to a cooling medium. In the second heat exchangers, the cooling medium removing some of the heat from the air is being fed from an external source (not shown in FIG. 1). The first heat exchanger 14 is utilized to pre-heat the air by utilizing exhaust gases coming from the third turbine T3. In a first combustor Comb1, the pressurized air is being mixed with fuel and heat is being released in the combustion process, in case of a typical combustor, thus heating the mixture of air and fuel generating hot gas. In second combustors Comb2, if any, the gas from the first turbine T1 or from an upstream turbine is being mixed with fuel and heat is being released in the combustion process, in case of a typical combustor, thus heating the mixture of gas from the first turbine T1 or from an upstream turbine further heating the gas and fuel. In the first turbine T1, in the second turbine T2 and in the third turbine T3, the hot exhaust gases expand and produce mechanical power to rotate the electrical generators, i.e., the first generator G1, the second generator G2 and the third generator G3, and the first compressor C1, the second compressor C2 and the third compressor C3. The first spool 10$a$ includes the first shaft 11$a$, the first compressor C1 and the first turbine T1. The second spool 10$b$ includes the second shaft 11$b$, the second compressor C2 and the second turbine T2. The third spool 10$c$ includes the third shaft 11$c$, the third compressor C3 and the third turbine T3.

Figure 2:
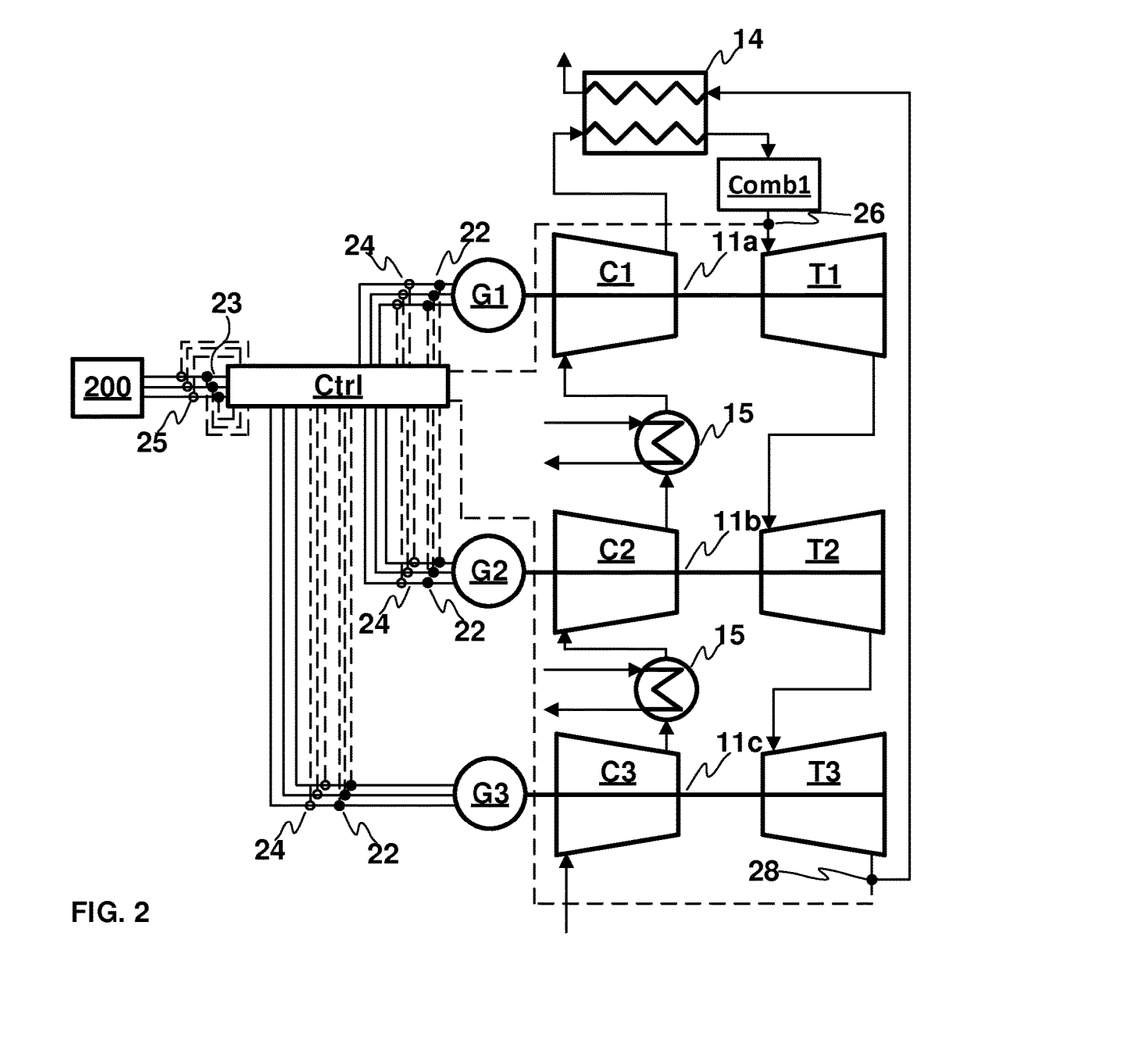
FIG. 2 illustrates schematically a gas turbine arrangement according to a preferable embodiment of the present invention.

In FIG. 2, a preferable embodiment of the present invention with three spools is shown, wherein the air coming into the system is being pressurized by the third compressor C3. Then the pressurized air is being fed into the second heat exchanger 15 connected in between the third compressor C3 and the second compressor C2. The second heat exchanger 15 decreases the temperature of the air by utilizing cooling medium such as, e.g., water to remove some of the heat from the air. Then the air is being fed into the second compressor C2 which further increases the pressure of the air. Then the pressurized air is being fed into another second heat exchanger 15 connected in between the second compressor C2 and the first compressor C1. Next, the air that has been compressed by and coming from the first compressor C1 is being fed into the first heat exchanger 14 in which the air is being pre-heated by utilizing the hot exhaust gases coming from the third turbine T3. After the first heat exchanger 14, the air is being fed into the first combustor Comb1 in which the air is being mixed with fuel and combusted in order to heat the mixture of the air and the fuel to produce hot exhaust gases. The exhaust gases are then fed into the first turbine T1 in which the exhaust gases are being expanded and produce mechanical power to rotate the first compressor C1 and the first generator G1. Then the exhaust gases are further being fed into the second turbine T2 in which the exhaust gases are being further expanded and produce mechanical power to rotate the second compressor C2 and the second generator G2. Then the exhaust gases are further being fed into the third turbine T3 in which the exhaust gases are being further expanded and produce mechanical power to rotate the third compressor C3 and the third generator G3. After that the exhaust gases are being fed to the first heat exchanger 14 after which the exhaust gases are being emitted from the gas turbine.

Furthermore, in FIG. 2, some examples of the measurements are shown which may be included into the arrangement according to a preferable embodiment or in any embodiment of the present invention. There may also be other measurements in the system as well. The examples of the measurements are shown with dashed lines. As can be seen in FIG. 2, there may be measurements of the output voltages 22 and currents 24 of the generators G1, G2 and G3 as well as measurements from the side of the load 200 such as, e.g., electrical grid voltages 23 and currents 25. There may also be additional measurements of the electrical parameters inside the control system Ctrl such as input and output voltages and/or currents of the converters and inverters, if utilized in the embodiment. The thermodynamic parameters such as, e.g., the first turbine inlet temperature 26 and the third turbine outlet temperature 28, i.e. the inlet temperature of the first heat exchanger may be measured in embodiments of the present invention including the first heat exchanger. There may also be other measurement such as, e.g., inlet temperatures of every turbine. All of the measurements may be fed to the control system Ctrl in order to monitor and/or control the operation of the gas turbine plant.

The first compressor C1 and the first turbine T1 may, preferably, be mounted on the first shaft 11a in such a way that they are in close proximity from each other. The first generator G1 may then be mounted on either side of this compressor-turbine pair on the first shaft 11a. Also, the second compressor C2 and the second turbine T2 may, preferably, be mounted on the second shaft 11b in such a way that they are in close proximity from each other. The second generator G2 may then be mounted on either side of this compressor-turbine pair on the second shaft 11b. Also, the third compressor C3 and the third turbine T3 may, preferably, be mounted on the third shaft 11c in such a way that they are in close proximity from each other. The third generator G3 may then be mounted on either side of this compressor-turbine pair on the third shaft 11c. When the elements are being in close proximity the pressure and heat losses may be minimized and the structure may be made compact. The first generator G1 may also be mounted in between the first compressor C1 and the first turbine T1. This may be the case for the second and third generators, G2 and G3, the second and third compressors, C2 and C3, and the second and third turbines, T2 and T3, mounted on the second and third shafts, 11b and 11c, respectively, as well.

Figure 3A:
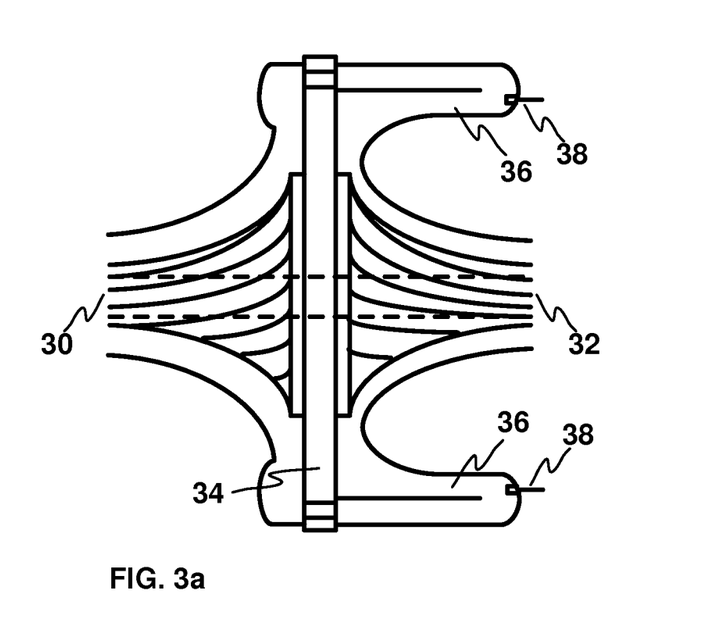
FIG. 3 illustrates schematically a planar element arranged between a compressor and a turbine utilized in an embodiment of the present invention.

In FIG. 3a, in case in which the compressors and turbines are mounted in close proximity from each other, a planar element 34 is shown that may be arranged between a compressor 30 and a turbine 32 according to embodiments of the present invention. In practical circumstances the close proximity may be realized disposing the compressor 30 and the turbine 32 adjacent to each other substantially separated only by the planar element 34. In these cases, an electrical generator may not be arranged between the compressor and the turbine. The plane defined by the planar element may be arranged to be perpendicular relative to the longitudinal axis of the shaft of the corresponding spool. The planar element may have, for example, a width from about 1 centimeter to about 20 centimeters. This also concerns embodiments including the recuperator 14 although not shown in FIG. 3a for clarity reasons. The structure enables minimization of the path of the air from the compressor 30 to the turbine 32 via the combustor 36. This will lead to lower pressure and heat losses.

On one side of the planar element 34, there is air coming from the compressor 30 and on the other side the heated gas leaving the combustor 36 to which the air is coming and to which the fuel is injected, e.g., from a fuel injection nozzle 38. This causes high temperature gradient over the planar element 34. In case of a spool to which the exhaust gases are coming from a turbine of another spool, there is air coming from the compressor 30 on the one side and the heated gas leaving a turbine of another spool on the other side. In this case too, the temperature gradient is high. The material of the planar element may be any material withstanding the high temperature gradient present in the gas turbines, such as e.g., nickel-chromium alloy, in order to separate the hot exhaust gases on the turbine side 32 from the cooler air on the compressor side 30.

Figure 3B:
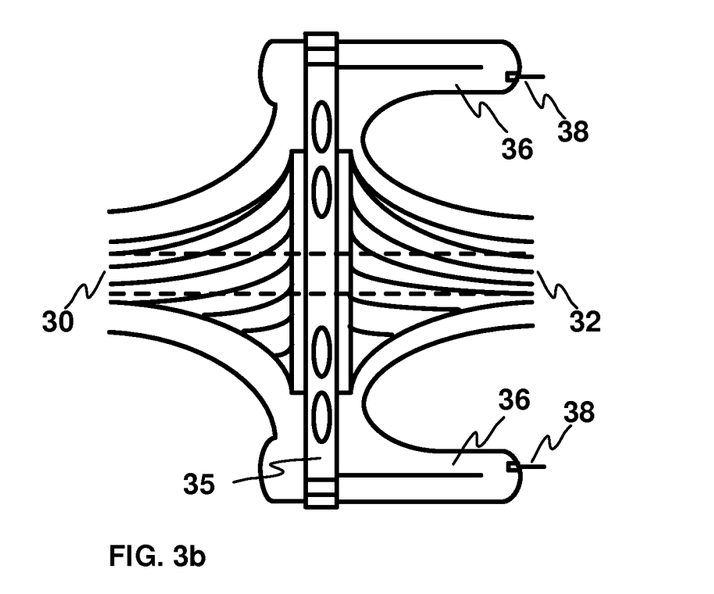

The planar element 34 may also be partially hollow, i.e. a partially hollow planar element 35 as shown in FIG. 3b, so that air can flow inside the partially hollow planar element 35 thus cooling down the element and providing good heat insulating properties. If the partially hollow planar element 35 is being used, it may be utilized in one, several or all of the spools.

Figure 4:
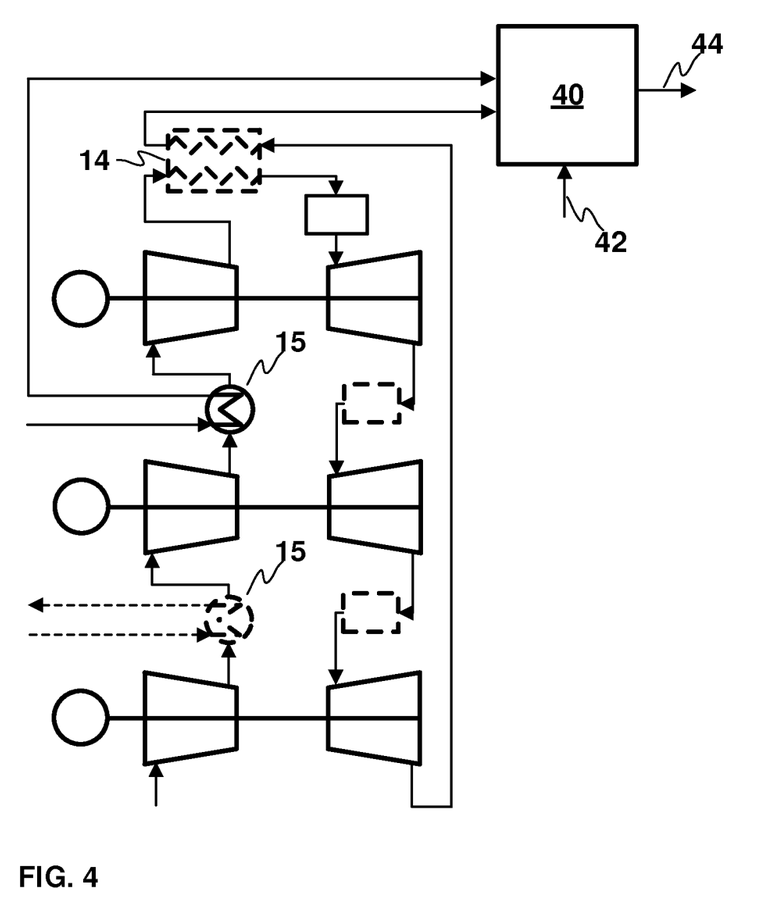
FIG. 4 illustrates a gas turbine plant arranged in fluid communication with an external process utilizing heat from the gas turbine according to an embodiment of the present invention.

In FIG. 4, the gas turbine arrangement is shown in fluid communication with an external process 40. The external process may be any heat utilization in general such as, e.g., a steam boiler, a space heating system, a duct burner or any other burner utilizing pre-heated gases. The external process may utilize the cooling medium coming from the intercooler. In case of, e.g., a duct burner there is also fuel 42 coming from an external source. As a product of the process, there may be, e.g., steam 44.

According to an embodiment of the present invention, the second heat exchanger 15, the first heat exchanger 14 and the second combustors Comb2, also shown in FIG. 1, all of which may be considered optional elements, are omitted. In this embodiment, the air coming into the system is being pressurized first by the third compressor C3 then fed into the second compressor C2 in order to be further pressurized. Then the air is being fed into the first compressor C1 in order to be pressurized further. Then the pressurized air is being fed into the first combustor Comb1 in which the pressurized air is being mixed with fuel in order to produce heat by combustion of the mixture of air and fuel.

After the first combustor Comb1, the exhaust gases are fed into the first turbine T1 in which the exhaust gases are being expanded and mechanical power is produced and the first compressor C1 and the first generator G1 are being rotated to produce electrical power. Then, the exhaust gases are fed into the second turbine T2 in which the exhaust gases are further being expanded to produce mechanical power and to rotate the second compressor C2 and the second generator G2 to produce electrical power. Then, the exhaust gases are further fed into the third turbine T3 in which the exhaust gases are further being expanded to produce mechanical power and to rotate the third compressor C3 and the third generator G3 to produce electrical power. After that the exhaust gases are emitted from the gas turbine.

According to an embodiment of the present invention, the first heat exchanger 14 and the second combustors Comb2, also shown in FIG. 1, all of which may be considered optional elements, are omitted. In this embodiment, the air coming into the system is being first pressurized by the third compressor C3. Then the air is being fed into a second heat exchanger 15 connected in between the third compressor C3 and the second compressor C2 which the heat exchanger 15 removes some of the heat from the air, therefore, lowering the temperature of the air. Then the air is being fed into the second compressor C2. Then the air is being fed into a second heat exchanger 15 connected in between the second compressor C2 and the first compressor C1 which the heat exchanger 15 removes some of the heat from the air, therefore, lowering the temperature of the air. Then the pressurized air is being fed into the first combustor Comb1 in which the pressurized air is being mixed with fuel in order to produce heat by combustion of the mixture of air and fuel. After the first combustor Comb1, the exhaust gases are fed to the first turbine T1 in which the exhaust gases are being expanded and mechanical power is produced and the first compressor C1 and the first generator G1 are being rotated to produce electrical power. Then, the exhaust gases are further fed into the second turbine T2 in which the exhaust gases are further being expanded to produce mechanical power and to rotate the second compressor C2 and the second generator G2 to produce electrical power. Then, the exhaust gases are further fed into the third turbine T3 in which the exhaust gases are further being expanded to produce mechanical power and to rotate the third compressor C3 and the third generator G3 to produce electrical power. After that the exhaust gases are emitted from the gas turbine.

According to an embodiment of the present invention, the second heat exchangers 15 and the second combustors Comb2, also shown in FIG. 1, all of which may be considered optional elements, are omitted. In this embodiment, the air coming into the system is being pressurized first by the third compressor C3. Then the air is being fed into the second compressor C2 after which the air is being fed into the first compressor C1. After that the air is being fed into the first heat exchanger 14. The first heat exchanger 14 transfers some of the heat from the exhaust gases coming from the third turbine T3 to the air thus pre-heating the air before the air is being fed into the first combustor Comb1 in which the pre-heated air is being mixed with fuel in order to produce heat by combustion of the mixture of air and fuel. After the first combustor Comb1 the exhaust gases are fed to the first turbine T1 in which the exhaust gases are being expanded and mechanical power is produced and the first compressor C1 and the first generator G1 are being rotated to produce electrical power. Then, the exhaust gases are further fed into the second turbine T2 in which the exhaust gases are further being expanded to produce mechanical power and to rotate the second compressor C2 and the second generator G2 to produce electrical power. Then, the exhaust gases are further fed into the third turbine T3 in which the exhaust gases are further being expanded to produce mechanical power and to rotate the third compressor C3 and the third generator G3 to produce electrical power. After that the exhaust gases are being fed to the first heat exchanger 14 after which the exhaust gases are being emitted from the gas turbine.

The exemplary embodiments of the present invention presented above with reference to FIG. 1 are just few possible embodiments. In FIG. 1, there are only three spools shown. Three spools is only an example and should not be considered as a limitation. Any combination of the elements marked with dashed lines with the elements marked with solid lines may be regarded as an embodiment of the present invention regardless of the number of spools being three or more.

According to an embodiment of the present invention, the arrangement includes an auxiliary system comprising an energy source which can be utilized in predefined (pre-thought) abnormal operating conditions such as, e.g. in case when there is a sudden surprising interruption in the electrical grid such as in case of loss-of-mains or in case of a planned maintenance outage, in order to safely and in controlled manner ramp the system up or down or to control the power injected to the load 200. In these cases, the control system of the gas turbine plant can be operated by utilizing the energy from the energy source of the auxiliary system. This energy source may be, e.g. but not limited to, a battery or a bank of batteries, a supercapacitor or a fuel cell system. By utilizing the auxiliary system, the control of the gas turbine remains operational and is able, e.g., to shut down the system safely or may run the system in an islanding condition.

According to various embodiments, active magnetic bearings may be used on each of the shafts 11a-11c of the spools 10a-10c. There may be one or more than one active magnetic bearing coupled to each one of the shafts. The active magnetic bearings may be used to determine the rotational speed of at least one of the shafts. The determined speed may be used in the control system to control the rotational speeds of shafts by the electrical generators G1-G3.

According to various embodiments of the present invention, most of the total output power supplied to the load 200 in the form of electrical and rotational power is generated by the electrical generators G1-G3 in the form of electrical energy. The total output power as defined herein does not include thermal output power such as energy exhausted out of the arrangement through an exhaust pipe, or thermal losses of the arrangement. According to an embodiment, at least 60 percent or, advantageously, at least 80 of the total output power supplied to the load 200 in the form of electrical or rotational power is outputted by the electrical generators G1-G3 in the form of electrical energy.

The load 200 herein refers to a load 200 that is external to the arrangement such as an electrical grid or a stand-alone electrical load such as an electrical supply system of, for example, a hospital or an industrial plant or a residential load.

Therefore, the electrical generators G1-G3 are arranged to produce the primary output power of the arrangement supplied continuously or on average to the load 200, which is external with respect to the arrangement, by the arrangement in the form of electrical energy, and not to act only as an auxiliary power source or only to control the operation of the arrangement. Continuously or on average supplied power to said load 200 external with respect to the arrangement refers herein to typical operating conditions such as in nominal operating conditions or at a part-load conditions excluding power produced intermittently, momentarily or for short periods of time, e.g., for a short power boost. However, the electrical generators G1-G3 may also be used also in controlling the operating of the gas turbine arrangement in conjunction with the amount of heat generated in the first combustor Comb1 as well as in second combustors Comb2, if any.

According to an embodiment, a part of the electrical output power of the electrical generators G1-G3 may be used, however, to operate the gas turbine arrangement, i.e., to self-consumption. The self-consumption may be, for example, the power needed for the control system or for the active magnetic bearings. However, most of the total output power of the arrangement supplied to the external load 200, i.e. at least 60 percent or, preferably, at least 80 percent is produced by the electrical generators G1-G3 in the form of electrical energy. Less than 40 percent or, preferably, less than 20 percent of the total output power in the form of electrical or rotational power, that is, e.g., rotational energy of a shaft 11a-11c may come from other sources such as from an additional turbine rotating an electrical generator or a rotatable device, such as a fan or a pump.

According to an embodiment, the power rating of an electrical generator G1-G3 may be 30-1500 kilowatts. According to another embodiment, the rotational speed rating of an electrical generator G1-G3 may be 10000-120000 revolutions per minute. According to various embodiments, the maximum value of the turbine inlet temperature of the highest pressure turbine T1 may be 600-1500 degrees of Celsius, preferably 750-1250 degrees of Celsius.

According to various embodiments of the present invention, the nominal power ratings and/or the nominal rotational speed ratings of the electrical generators may be equal or different.

According to various embodiments of the present invention, the nominal power and/or nominal rotational speed ratings of the generators are substantially equal. According to various embodiments, the ratings may differ 10 or 15 percent from each other at most relative to the power rating of a generator with the highest power rating and still fall under the concept of substantially equal rating disclosed herein. In certain embodiments, the gas turbine process may be designed in such a way that it is beneficial to have slightly higher difference in the power ratings of the generators in order to optimize the operation of the system. The limit for the difference in the ratings may, depending on the case, thus also be 15 percent relative to the power rating of a generator with the highest power rating.

According to various embodiments, the rotational speeds of the rotating parts of the electrical generators G1-G3, that is their rotors, may differ from each other or be substantially equal.

According to various embodiments, particularly, but not necessarily or limited to, the embodiments with equal nominal power and rotational speed ratings of the electrical generators, the rotational speeds of the rotating parts of the electrical generators G1-G3, that is their rotors, may not differ more than 30 percent relative to the rotational speed of the generator coupled to the fastest rotating spool.

According to various embodiments, the electrical powers outputted by the electrical generators G1-G3 may differ from each other or be substantially equal.

According to various embodiments, particularly, but not necessarily or limited to, the embodiments with equal nominal power and rotational speed ratings of the electrical generators, the electrical powers outputted by the electrical generators G1-G3 may, preferably, be such that the difference between the electrical powers of the generators G1-G3 relative to the nominal power rating of one of the electrical generators does not exceed 60 percent. In embodiments with different nominal power ratings, the electrical powers outputted by the electrical generators G1-G3 do not differ more than 60 percent from each other relative to the nominal power rating of the electrical generator with highest nominal power rating.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A controllable multi-spool gas turbine plant for generating an electric power provided to a load located outside of the plant, the plant comprising:
at least three spools, at least three shafts, at least three compressors, and at least three turbines, wherein
each of the at least three spools comprises a respective shaft of the at least three shafts, a respective compressor of the at least three compressors, and a respective turbine of the at least three turbines, and has the compressor and the turbine mounted on the shaft, during operation of the plant, one of the at least three compressors, operating at a highest pressure among other compressors of the at least three compressors, is defined as a highest pressure compressor, another one of the at least three compressors, operating at a lowest pressure among other compressors of the at least three compressors, is defined as a lowest pressure compressor, one of the at least three turbines, operating at a further highest pressure among other turbines of the at least three turbines, is defined as a highest pressure turbine, another one of the at least three turbines, operating at a lowest pressure among other turbines of the at least three turbines, is defined as a lowest pressure turbine; and the highest pressure compressor and the highest pressure turbine are mounted on one of the at least three shafts, and the lowest pressure compressor is mounted on another one of the at least three shafts; and the at least three spools are in a fluid communication with each other, wherein each of the at least three turbines, other than the highest pressure turbine, is configured to receive a gas at a higher pressure from an immediately preceding upstream turbine of the at least three turbines, and each of the at least three compressors, other than the lowest pressure compressor, is configured to receive an air at lower pressure for further compressing from an immediately preceding compressor of the at least three compressors;

wherein at least one compressor of the at least three compressors and at least one turbine of the at least three turbines mounted on at least one shaft of the at least three shafts are separated only by a planar element arranged between the at least one compressor and the at least one turbine, wherein a plane defined by the planar element is perpendicular to a longitudinal axis of the at least one shaft, and the planar element is a partially hollow planar element arranged such that a corresponding air can flow inside the partially hollow planar element providing cooling for the partially hollow planar element;

one or more combustors having at least one combustor configured to combust or react a mixture of a fuel with a compressed air from the highest pressure compressor and to provide a compressed gas with an elevated temperature to the highest pressure turbine to be expanded in the highest pressure turbine to produce a mechanical power to rotate the highest pressure compressor and a corresponding electrical generator of at least three electrical generators, the corresponding electrical generator driven by a corresponding spool of the at least three spools;

wherein the at least three electrical generators are configured to generate the electric power, each electrical generator being mechanically directly coupled to a corresponding shaft of the at least three shafts to be rotatably driven, wherein at least 60 percent of a total output power provided to the load is the electric power, generated by the at least three generators; and a controller, configured to efficiently control operations of the at least three spools and electrical outputs of the at least three generators for controlling the electric power provided to the load located outside of the plant, wherein the controlling comprises a substantially independent individual control of each of the at least three generators including at least a rotational speed control of each of the at least three generators.

2. The plant of claim 1, wherein the plant further comprises:
   a first heat exchanger arranged to receive said compressed air from the highest pressure compressor prior to combustion in the at least one combustor, and
   wherein, an output gas from a last downstream turbine of the at least three turbines, having a lowest pressure of the at least three turbines, so that the last downstream turbine is the lowest pressure turbine, providing said output gas to the first heat exchanger, causing heat transfer from said output gas to said compressed air to pre-heat said compressed air prior to the combustion in the at least one combustor.

3. The plant of claim 1, wherein the plant further comprises:
   at least one second heat exchanger, being arranged fluidly between two compressors of the at least three compressors, the two compressors are mounted on adjacent shafts,
   wherein the at least one second heat exchanger is configured to receive a corresponding compressed air having a first pressure from a first compressor of the two compressors, and to receive cooling medium from an external source to decrease a temperature of said corresponding compressed air having the first pressure, and to further provide the corresponding cooled compressed air to a further a second compressor of the two compressors for compressing the provided corresponding cooled compressed air into a second corresponding compressed air, the second compressor operating at a second pressure which is higher than the first pressure.

4. The plant of claim 3, wherein the plant further comprises:
   a heat utilization process arranged in a fluid communication with the controllable multi-spool gas turbine plant in which the cooling medium of the at least one second heat exchangers comprises water and is injected to the heat utilization process and utilized for heating.

5. The plant of claim 1, wherein the plant further comprises:
   at least one second combustor of the one or more combustors, being arranged fluidly between two turbines of the at least three turbines, and the two turbines are mounted on adjacent shafts, the at least one second combustor is operable to combust or react a second mixture of a corresponding fuel with a corresponding gas from a first of the two turbines, the at least one second combustor being arranged to re-heat said corresponding gas from the first of the two turbines operating at a higher pressure of the two turbines and to transfer said re-heated corresponding gas from the first turbine operating at higher pressure of the two turbines to a second turbine of the two turbines, the second turbine operating at a lower pressure than the first of the two turbines.

6. The plant of claim 1, wherein the at least one combustor of the one or more combustors comprises an ignition system and a fuel injection system.

7. The plant of claim 1, wherein at least one of the at least three compressors is a centrifugal compressor.

8. The plant of claim 1, wherein at least one of the at least three turbines is a radial turbine.

9. The plant of claim 1, wherein each electrical generator of the at least three electrical generators is mounted on the corresponding shaft on a side of only one of the corresponding compressor and the corresponding turbine.

10. The plant of claim 1, wherein for each of the at least three spools, the respective compressor and the respective turbine are mounted on the shaft in close proximity to each other to forms a compressor-turbine pair.

11. The plant of claim 1, wherein the plant is for land-based applications.

12. The plant of claim 1, wherein the plant is for marine-based applications.

13. The plant of claim 1, wherein the load is an electrical grid.

14. The plant of claim 1, wherein the load is a stand-alone electrical load of an electrical supply system of a hospital, an industrial plant or a residential load.

15. The plant of claim 1, wherein the controller is configured to control fuel injection into the one or more combustors.

* * * * *